3,476,705
POLYAMIDE-ACID POLYMERS AND POLYIMIDES PREPARED FROM AZOBENZENE TETRACARBOXYLIC DIANHYDRIDES
Robert L. Hansen, Roseville, Minn., assignor to Minnesota Mining & Manufacturing Company, St. Paul, Minn., a corporation of Delaware
No Drawing. Filed Aug. 23, 1966, Ser. No. 574,562
Int. Cl. C08g 20/02
U.S. Cl. 260—47                    20 Claims

ABSTRACT OF THE DISCLOSURE

Polyamide-acid polymers and polyimides are made by condensing azobenzene tetracarboxylic dianhydride with a diamine containing at least two carbon atoms. The polyamide acids can be isolated as an intermediate stage polymer, which upon dehydration or by heating or other suitable means is converted to a polyimide which is strong and tough.

---

This invention relates to thermally resistant polymers and more particularly to certain novel aromatic polyimides.

A number of linear polymeric polyimides are known and some of these have useful properties which permit them to be shaped into films or sheets. An especially useful property of such films is their ability to withstand high temperature without decomposition or embrittlement. While some of the polyimides heretofore known have had useful high temperature properties, they have also in some cases suffered from poor adherence to metallic surfaces and have required priming or other procedures before films of these materials adhered to bare metal. Further, many of these materials were not resistant to degradation by ultraviolet light.

It is an object of the present invention to produce certain new polyimides having useful high temperature properties.

It is a further object of the invention to produce polyimides which are hydrolytically stable and have good adherence to metals in addition to their resistance to high temperatures.

Other objects of the invention will be apparent from the disclosures hereinafter made.

In accordance with the above and other objects of the invention, it has been found that polyimides formed by the reaction of suitable derivatives of azobenzene tetracarboxylic acids and certain diamines can be produced in a two-stage process ultimately resulting in extremely useful polymers having recurrent units of the formula:

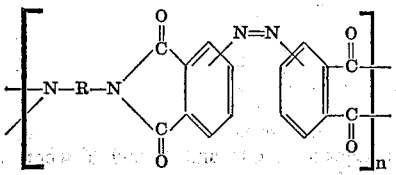

wherein R is a divalent organic radical containing at least 2 carbon atoms, in which no more than one of said valence bonds is located on any one carbon atom of said R radical, and n is a number from 10 to 1000 or more.

The azobenzene tetracarboxylic acids occur in isomeric forms and any of these can be used, e.g. as their anhydrides or ester-acids, to make the polymers of the invention. The anhydrides can be termed azo-phthalic anhydrides, e.g. 3,3'-azo-phthalic anhydride, 4,4'-azo-phthalic anhydride and 3,4'-azo-phthalic anhydride.

In a further aspect of the invention there are conprehended polyamide-acids having recurrent units of the formula:

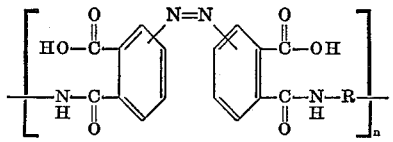

wherein R and n have the same significance as hereinabove. These are extremely useful materials, in that they are soluble in certain organic solvents, e.g. dimethyl acetamide, from which solutions they can be fabricated into desired useful coatings or structures (e.g. laminates) which can then be cured to the polyimide form, while remaining in essentially the same configuration, as described in more detail hereinafter.

The polyimides of the invention can be formed into thin films, which are tough and flexible and have high tensile strength and modulus of elasticity. Surprisingly, the new polyimides are very resistant to ultraviolet degradation. They are furthermore insoluble in all common organic solvents, and are very strongly adherent to clean metal surfaces, even without priming or other pretreatment of the metal.

For producing the polymers of the invention, an azobenzene tetracarboxylic acid derivative such as, for example, the dianhydride, is reacted with a diamine of the formula:

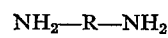

$$NH_2—R—NH_2$$

wherein R is a divalent radical as defined hereinabove, at a temperautre in the range of zero to 350° C. When an anhydrous solvent is used, and the temperature is below about 50°–100° C., the polyamide-acid polymers are formed. Above that temperature range, complete condensation takes place to form the polyimide polymers. However, reaction temperatures above 100° C. can also be employed to form polymers which are not completely cured, i.e. which contain some polyamide-acid, thus retaining a degree of solubility.

The organic diamines useful in the polymerization reaction are characterized by the formula:

$$H_2N—R'—NH_2$$

wherein R', the divalent radical, may be selected from the following groups: aromatic, aliphatic, cycloaliphatic, combination of aromatic and aliphatic, heterocyclic, bridged organic radicals wherein the bridge is oxygen, nitrogen, sulfur, silicon or phosphorus, and substituted groups thereof. The most useful diamines are the primary diamines. Although secondary diamines such as piperazine may be used to produce the polyamide-acid compositions of the present invention, only the primary diamines, upon reaction with the dianhydrides, provide polyamide-acids which after shaping may be converted into the polyimides. Preferred R' groups in the diamines are those containing at least 6 carbon atoms characterized by benzenoid unsaturation, i.e. alternate double bonds in a ring structure.

Diamines suitable for use in producing the polymers of the invention include those disclosed in U.S. Letters Patent 3,179,633; 3,179,634 and 3,190,856. These are e.g.

meta-phenylene diamine;
para-phenylene diamine;
4,4'-diamino-diphenyl propane;
4,4'-diamino-diphenyl methane;
benzidine;
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;

bis-(4-amino-phenyl)diethyl silane;
bis-(4-amino-phenyl)phosphine oxide;
bis-(4-amino-phenyl)-N-methylamine;
1,5-diamino-naphthalene;
3,3′-dimethyl-4,4′-diamino-biphenyl;
3,3′-dimethoxy benzidine;
2,4-bis-(beta-amino-t-butyl)toluene;
bis-(para-beta-amino-t-butyl-phenyl)ether;
para-bis-(2-methyl-4-amino-pentyl)benzene;
para-bis-(1,1-dimethyl-5-amino-pentyl)benzene;
m-xylylene diamine;
para-xylylene diamine;
bis-(para-amino-cyclohexyl)methane;
hexamethylene diamine;
heptamethylene diamine;
octamethylene diamine;
nonamethylene diamine;
decamethylene diamine;
3-methyl-heptamethylene diamine;
4,4-dimethylheptamethylene diamine;
2,11-diamino-docecane;
1,2-bis-(3-amino-propoxy)ethane;
2,2-dimethyl-propylene diamine;
3-methoxy-hexamethylene diamine;
2,5-dimethylhexamethylene diamine;
2,5-dimethylheptamethylene diamine;
5-methylnonamethylene diamine;
1,4-diamino-cyclohexane;
1,12-diamino-octadecane;
$H_2N(CH_2)_3O(CH_2)_2O(CH_2)_3NH_2$;
$H_2N(CH_2)_3S(CH_2)_3NH_2$;
$H_2N(CH_2)_3N(CH_3)(CH_2)_3NH_2$ and mixtures thereof.

Mixtures of these diamines can also be employed. The diamines can contain non-interfering substituents, such as halogens, e.g. chlorine, fluorine; nitro and amido groups; alkyl groups including perfluoroalkyl, alkoxy groups; (trialkysilyl, and monovalent aryl, arylsulfonyl, aryloxy, aroyl, triarylsilyl groups.

A preferred group of diamines included within the scope of the invention are certain divalent aromatic diamines, e.g. monocyclic diamines, such as p-phenylene diamine, m-phenylene diamine, 2,4-toluenediamine, 2,5-toluenediamine, 2,5-diaminochlorobenzene, 2,4-diaminoanisole and the like; bicyclic diamines, such as 1,4-diaminonaphthalene (naphthylene diamine) and the like; and bis-cyclo diamines, such as those of the formula:

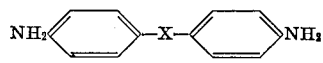

wherein X is a divalent linking group, of the group consisting of —S—, —SO$_2$—, —SO—, —O— and

—C(R$^1$R$^2$)— wherein R$^1$ and R$^2$ are hydrogen or lower alkyl radicals. Exemplary bis-cyclo diamines are bis(4-aminophenyl)-ether, diaminodiphenyl sulfone, diaminophenyl methane, 4,4′-propylidene dianiline, thiodianiline and the like.

The polyimides of the invention are conveniently and preferably formed in two reaction stages. In the first stage, the reactants are heated in an anhydrous polar organic solvent to form a polyamic acid according to the equation:

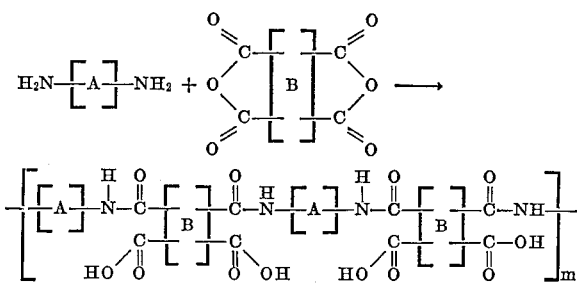

wherein

represents the divalent residue of the organic diamine and

represents the tetravalent residue of azo-benzene, and m is a number upwards of about 10.

Ordinarily, equimolar amounts of dianhydride and diamine are used, but up to 5 percent excess of either reactant can be used to control the degree of polymerization. If desired, chain terminating agents, e.g. a small proportion of a reactant such as phthalic anhydride, can be used for this purpose.

In this stage, the polymers are soluble in certain solvents as hereinafter described and are most easily handled for fabrication. Plasticizers, pigments, fillers and the like can be added to these first stage polymers. Preferably, the inherent viscosity of the polymer thus formed is from about 0.05 to 2.5, measured as a 0.5 weight percent solution. Such polymers are more useful for making coatings or structures of desired shape.

Upon removal of the solvent and elimination of water as by heating under atmospheric pressure or in vacuo, or by chemical treatment as with dehydrating agents (e.g. acid anhydrides) a second stage polymer, a polyimide, is formed having the structure shown in the formula:

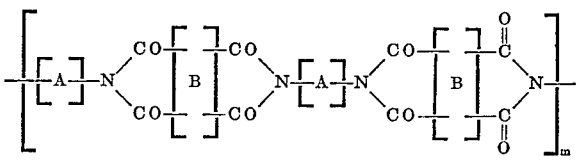

wherein

and m have the significance heretofore set forth.

Alternatively, the polyimides of the invention can be formed by simply heating the reactants together in melt polymerization; or the dianhydride can be reacted with an alkanol (e.g. ethanol) to form a monomeric diester-diacid, which is heated with the diamine to polymerize in the melt.

Broadly, the infusible polymers of the invention and their intermediate polymers can be viewed generically as consisting of recurrent units of the formula:

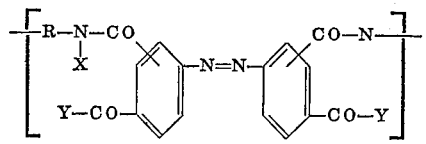

wherein R has the significance set forth above, X represents H, Y represents OH and X and Y when taken together are a valence bond joining the carbon and nitrogen atoms to which they are attached.

The polyimides of the invention can be heated to high temperatures, of the order of 500° C., without melting or significant loss of weight. They are soluble to a limited extent in concentrated sulfuric acid, or fuming nitric acid. Because of their strength, limited solubility and ultraviolet light resistance, as well as their great thermal stability, the polyimides of the invention are very useful for films, coatings, dielectric purposes, laminating sheets of glass fibers, paper, mica and the like.

The following examples, in which all parts are by weight unless otherwise specified, will more specifically illustrate the polymers of the invention, and the best mode presently known for their production and use.

Example 1.—Preparation of azobenzene tetracarboxylic dianhydrides

To a solution of 48 g. of sodium hydroxide (1.2 moles) in 300 ml. of water were added 42.2 g. (0.2 mole) of 4-nitro-phthalic acid and 28 g. of zinc dust. The mixture was stirred while refluxing for about 4 hours. The resulting dark red solution was cooled, filtered to remove all solids and then acidified with 40 ml. of concentrated sulfuric acid. The voluminous red precipitate which resulted was filtered to remove the 3,4,3',4'-azobenzene tetracarboxylic acid formed in the reaction. The acid was washed once with about 100 ml. of water, then passed dry, and finally dried at 110° C. at 1 mm. Hg pressure for two hours. The dried solid thus obtained was dissolved in 100 ml. of boiling dimethyl acetamide, filtered hot, then reheated to boiling. To the hot solution was added 180 ml. of acidic anhydride, slowly so as to control the exothermic reaction which takes place. On cooling, red crystals of 3,4,3',4'-azobenzene tetracarboxylic dianhydride (conveniently abbreviated 3,4 ABTD) were formed. These were removed by filtration, and dried at 110° C. at 1 mm. Hg pressure. The anhydride melts at about 329°–331° C.

Using the same procedure, but substituting 3-nitrophthalic acid, there was obtained 2,3,2',3'-azobenzene tetracarboxylic dianhydride (conveniently abbreviated 2,3 ABTD), melting at about 315°–319° C.

Example 2

A solution of 2 g. of oxydianiline in 47 g. of dimethyl acetamide was prepared. The solution was placed in a container with screw threaded cap and a polypropylene dish containing 3.22 g. of 3,4 ABTD was floated on the surface. The jar was tightly sealed using a screw cap having a polytetrafluoroethylene liner. The presence of moisture was avoided by conducting all of the operations in a dry box. The jar was then shaken to mix the contents, until a clear red solution was obtained. After one hour, the inherent viscosity of this solution was 1.43 (concentration, 0.5 percent). The solution was the polyamic acid polymer of 3,4,3',4'-azobenzene tetracarboxylic dianhydride with oxydianiline.

Films of the solution obtained above were cast on glass plates, using a knife coater set at 25 mils. These films were dried in a vacuum oven at 40° C. at 15 mm. pressure of two hours. The resulting self-supporting films could be stripped from the glass. These films were clamped in a frame and cured for one hour at each of the following temperatures: 90°, 150° and 260° C. The resulting polyimide film was clear, red and transparent. Thermogravimetric analysis showed a 10 percent weight loss at 513° C. when the film was heated at the rate of 5° C. per minute in air. The thickness of the film was 1.2 mils, and test and showed it had tensile strength of 18,000 p.s.i. and elongation of 15.3 percent at break.

Example 3

Operating in a dry box, 3.22 g. of 3,4 ABTD contained in a polypropylene boat were floated on the surface of a solution of 1.843 g. of benzidine in 36.6 g. of dimethyl acetamide. The jar was capped with a screw threaded cap having a polytetrafluoroethylene liner. After shaking, the solution became very viscous and consisted of a dimethyl acetamide solution of the polyamic acid polymer of 3,4 ABTD and benzidine. The solution had an inherent viscosity of 2.1 (concentration, 0.5 percent). About 24 g. of this solution were mixed with 1.8 g. of 3:1 acidic anhydride:pyridine solution, and then cast as a film upon a glass plate. After removal of the solvent by evaporation, the film could be stripped from the glass. On standing, it became partially cured and was permitted to shrink about 30 percent in size, then constrained in a frame and cured for one hour at each of the temperatures: 90°, 150° and 260° C. The red, cured film had 10 percent weight loss at 535° C. in the TGA apparatus. The film had tensile strength at break of 26,100 p.s.i. and a modulus of 541,000 p.s.i.

Example 4

Using the same polymerization technique described in Example 2, 3.22 g. of 2,3 ABTD were polymerized with 2 g. of oxydianiline (4,4'-aminodiphenyl ether) in 47 g. of dimethyl acetamide. The resulting solution of polyamic acid polymer of 2,3 ABTD and oxydianiline was a deep red color, having solution viscosity of 1.20 (concentration, 0.5). This solution was cast into a film and thermally cured as described in Example 1. The film was a tough, clear, red polyimide film having a high degree of thermal stability, showing only a very small weight loss at temperatures of the order of 500° C.

Example 5

Proceeding in a similar way as described in Example 3, but using equivalent amounts of ethylene diamine; p-phenylene diamine; 2,6-diamino pyridine; bis(4-aminophenyl)propane; p-xylylene diamine; octamethylene diamine and 1,4-diaminocyclohexane, dark red, azo-group containing polyimides are obtained having similar properties.

Example 6

When the polyamic-acid solutions in dimethyl acetamide as obtained in Examples 3 and 4 were cast upon previously cleaned copper, steel or Nichrome plates, and the film thus cast was cured in place by heating at the temperatures shown, composites consisting of strongly adherent films of the red polyimide on the metal were obtained. Likewise, these viscous solutions functioned as wire varnishes. When e.g. an 18 gauge solid copper wire was passed through the solution in dimethyl acetamide obtained in Example 3, and the solvent removed by evaporation, by passing the wire through an elongated heating chamber, which at the entering end was about 50°–100° C., then progressively increased in temperature up to about 350° C., a strongly adherent polyimide coating was formed on the wire. This was flexible, high temperature-resistant and had good electrical properties.

Filaments of the polyimides of the invention can also be obtained by squirting the solution of the polyamic acid stage of the polymer obtained as described above through a spinning die into an elongated drying chamber to remove the solvent and form a self-supporting fiber of the polyamic acid polymer stage; this is converted to the polyimide stage by heating as set forth above, or by passing the filament through a solution of a chemical dehydrating agent, e.g. acidic anhydride.

Polyimide acid solutions made from 3,4,3',4'-azobenzene tetracarboxylic dianhydride (3,4 ABTD) or 2,3,2',3'-azobenzene tetracarboxylic dianhydride (2,3 ABTD) and a diamine can be coated on a clean copper surface, then cured to yield a tough polyimide film which has excellent adhesion to copper. Alternatively, polyamide acid solutions made using azobenzene tetracarboxylic anhydrides can be used as adhesives to laminate other uncured polyamide acid films to copper. Upon heat curing, this structure, a tough, thermally stable construction of polyimide film laminated to copper is obtained. Such a construction made on copper foil is not delaminated by folding, bending or twisting of the structure. It will not delaminate on heat aging at 260° C. for two weeks.

Such constructions of polyimide film on copper are conveniently made by first knife coating a solution of polyamide acid from 3,4 ABTD and oxydianiline in dimethyl acetamide solution on the copper surface. Then an uncured film of polyamide acid, e.g. prepared from pyromellitic dianhydride and oxydianiline is overlaid in such a manner as to make a bubble free construction. This construction is then cured by heating to 90°, 150° and 260° C. for periods of one hour at each temperature.

Such polyimide-on-copper laminates as described above are useful as a material for construction of computer memory circuits and in other applications such as printed circuitry where the copper can be selectively removed by chemical etching.

Other applications of polyimides containing 2,3 ABTD and 2,3 ABTD with diamines include laminating glass fabric and "Pluton" cloth fabric to copper surfaces. Such constructions are tightly bonded to the copper by the polyimide. Such constructions are useful for insulating copper electrical conductors and for providing ablative coatings for re-entry vehicles.

Polyimides of 2,3 ABTD and 3,4 ABTD with any of various diamines are easily prepared as cloth-reinforced sheets. Thus, for example, cloth composed of carbon or graphite fibers is saturated with the polyamide acid solution, then dried and finally heat cured. Such a construction containing 30 percent by weight of cured polyimide polymer shows outstanding ablative properties in an oxygen-gas flame, far superior to those of a comparable coating of a polyimide from pyromellitic dianhydride and oxydianiline.

The polyimide from 2,3- and 3,4-ABTD with various diamines when in the form of films shows superiors ultraviolet light stability as compared with polyimide films prepared from pyromellitic dianhydride or benzophenone tetracarboxylic dianhydride and a diamine. For example, a film of polyimide from 3,4 ABTD and oxydianiline placed 4 inches from a Hanovia lamp (2537 A. light) for five days, showed no degradation. Films of polyimides from pyromellitic dianhydride or benzophenone tetracarboxylic dianhydride and oxydianiline showed extensive degradation as evidenced by chalking and cracking when exposed to UV in a similar manner.

What is claimed is:

1. A polyamide-acid polymer consisting essentially of recurrent units of the formula

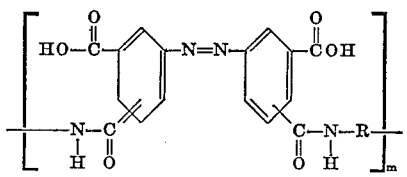

wherein R is a divalent organic radical containing at least 2 carbon atoms, in which no more than one nitrogen to carbon valence bond is located on any one carbon atom of the said R radical and $m$ is a number upwards of about 10.

2. A polyimide consisting essentially of recurrent units of the formula

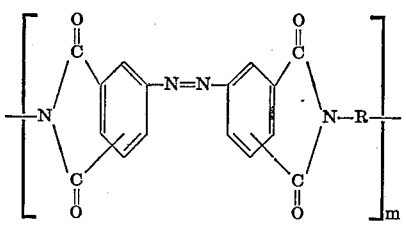

wherein R is a divalent organic radical containing at least 2 carbon atoms, in which no more than one nitrogen to carbon valence bond is located on any one carbon atom of the said R radical and $m$ is a number upwards of about 10.

3. A polymeric composition according to claim 1, dissolved in an organic solvent.

4. A film of a polyamide-acid according to claim 1.

5. A filament of a polyamide-acid according to claim 1.

6. A metallic article coated with a polyamide-acid polymer according to claim 1.

7. An electrically conductive wire coated with a film of a polyamide-acid according to claim 1.

8. A metallic article coated with a polyimide according to claim 2.

9. A film of a polyimide according to claim 2.

10. A filament of a polyimide according to claim 2.

11. A polyamide-acid polymer according to claim 1, wherein R is the divalent radical

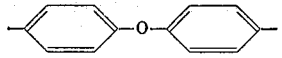

12. Poly bis(4-aminophenyl)ether azobenzene tetracarboxyimide according to claim 2.

13. Poly(bis-4-aminophenyl)ether 3,4,3',4'-azobenzene tetracarboxylimide according to claim 2.

14. A polymer according to claim 2, wherein R is the divalent radical

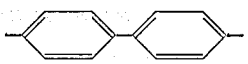

15. A copper sheet coated with a polymer according to claim 12.

16. A copper sheet coated with a polymer according to claim 13.

17. A copper wire coated with a polymer according to claim 12.

18. A copper wire coated with a polymer according to claim 13.

19. A polyamide-acid polymer according to claim 1, in which the carbonyl groups are in 2,3,2',3' position and R is the divalent radical

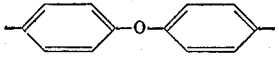

20. A polymer according to claim 1, in which R is the divalent radical

References Cited

UNITED STATES PATENTS 3,179,630   4/1965   Endrey _____ 260—78
3,355,427   11/1967  Loncrini _____ 260—47

FOREIGN PATENTS 672,985   3/1966   Belgium.

WILLIAM H. SHORT, Primary Examiner

L. L. LEE, Assistant Examiner

U.S. Cl. X.R.

117—132, 128.4, 232; 260—78, 78.4